United States Patent
Sandhaus et al.

(10) Patent No.: US 12,556,607 B2
(45) Date of Patent: Feb. 17, 2026

(54) TELEMETRY-BASED ANOMALY DETECTION

(71) Applicant: MELLANOX TECHNOLOGIES, LTD., Yokneam (IL)

(72) Inventors: Ran Sandhaus, Tel Aviv (IL); Vladimir Shalikashvili, Petah-Tiqwa (IL); Hanan Shteingart, Herzliya (IL); Amihay Tabul, Ness Ziona (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 84 days.

(21) Appl. No.: 18/600,435

(22) Filed: Mar. 8, 2024

(65) Prior Publication Data

US 2025/0286927 A1   Sep. 11, 2025

(51) Int. Cl.
  *G06F 15/16* (2006.01)
  *H04L 67/12* (2022.01)
  *H04L 67/147* (2022.01)

(52) U.S. Cl.
  CPC ............ *H04L 67/12* (2013.01); *H04L 67/147* (2013.01)

(58) Field of Classification Search
  CPC .............................. H04L 67/12; H04L 67/147
  USPC ........................................................ 709/224
  See application file for complete search history.

(56) References Cited

U.S. PATENT DOCUMENTS

| | | | |
|---|---|---|---|
| 11,494,200 B2 * | 11/2022 | Liang | G06F 16/907 |
| 11,516,308 B1 * | 11/2022 | Dubynskiy | G06F 11/3476 |
| 11,960,907 B2 * | 4/2024 | Liang | G06N 20/20 |
| 12,007,865 B2 * | 6/2024 | Kommula | H04L 41/16 |
| 12,072,906 B2 * | 8/2024 | Cardente | G06F 16/258 |
| 12,099,427 B2 * | 9/2024 | Kommula | H04L 41/0609 |
| 12,113,686 B2 * | 10/2024 | Juneja | H04L 43/16 |
| 12,159,250 B2 * | 12/2024 | Raymond | G06N 7/01 |
| 12,184,394 B2 * | 12/2024 | Bode | G06N 20/00 |
| 12,373,322 B2 * | 7/2025 | Kommula | G06N 5/046 |
| 2019/0339989 A1 * | 11/2019 | Liang | G06F 9/5072 |
| 2021/0232472 A1 * | 7/2021 | Nagaraj | G06N 3/09 |
| 2021/0264375 A1 * | 8/2021 | Himura | G06Q 10/04 |
| 2022/0374796 A1 * | 11/2022 | Raymond | G06N 7/01 |
| 2023/0018913 A1 * | 1/2023 | Liang | G06Q 10/0631 |
| 2023/0142161 A1 * | 5/2023 | Nicotera | G06N 3/063 706/27 |
| 2023/0333956 A1 * | 10/2023 | Kommula | H04L 43/08 |
| 2023/0336408 A1 * | 10/2023 | Kommula | H04L 41/0604 |
| 2023/0336447 A1 * | 10/2023 | Kommula | H04L 41/0681 |
| 2024/0187310 A1 * | 6/2024 | Bhandaru | H04L 67/12 |
| 2024/0187321 A1 * | 6/2024 | Juneja | H04L 41/16 |
| 2024/0193177 A1 * | 6/2024 | Cardente | G06F 16/258 |
| 2024/0211368 A1 * | 6/2024 | Kommula | H04L 41/0604 |

* cited by examiner

*Primary Examiner* — Moustafa M Meky

(74) *Attorney, Agent, or Firm* — Sheridan Ross P.C.

(57) ABSTRACT

A system for predicting and/or capturing data relating to anomalies in a networking device is provided. In one example, a networking device receives telemetry data, stores the telemetry data in a cyclic buffer, detects an anomaly, and outputs the telemetry data from the cyclic buffer. The telemetry data from the cyclic buffer may be used for training a prediction model. In another example, a trained prediction model analyzes telemetry data sampled at a first rate, predicts a future anomaly, and in response to the prediction of the future anomaly, triggers sampling of the telemetry at a second rate, faster than the first rate.

20 Claims, 5 Drawing Sheets

TELEMETRY-BASED ANOMALY DETECTION

FIELD OF THE DISCLOSURE

The present disclosure is generally directed toward networking and, in particular, toward networking devices and methods of operating the same.

BACKGROUND

Datacenters and similar technology are increasingly becoming the backbone of modern digital infrastructure, supporting services such as the training of machine learning (ML) and artificial intelligence (AI) models, where the datacenters provide computational resources and data storage capabilities. ML models, for example, rely on the scalable, efficient, and powerful infrastructure provided by datacenters. Such facilities enable the processing and analysis of datasets at high speeds, facilitating the training of sophisticated ML models that can recognize patterns, make predictions, and support decision-making processes.

As datacenters become increasingly important, the networks relied upon by datacenters are constantly required to grow and support increasing intensities of bandwidth. This surge is driven by the demands of high-volume, high-speed data processing tasks, including those associated with machine learning workloads.

To manage and optimize the performance of such complex networks, traditional pull-based monitoring techniques, such as simple network management protocol (SNMP), are proving inadequate. SNMP, which involves periodically polling network devices for status updates, struggles to keep pace with the dynamic nature of modern datacenter networks, leading to gaps in visibility and delayed responses to network conditions.

BRIEF SUMMARY

Unlike SNMP, streaming telemetry is a push-based method where network devices stream data (e.g., continuously, periodically, or semi-periodically) about their status, performance, and metrics to a central monitoring system in real-time. Streaming telemetry allows for near-instantaneous visibility into network conditions, enabling more proactive and precise management of datacenter networks. Streaming telemetry supports the detection and resolution of issues before the issues impact services. Using systems and methods described herein, streaming telemetry can be used to optimize network performance and help in making data-driven decisions, ensuring that the infrastructure supporting machine learning and other critical applications remains robust and efficient.

In accordance with one or more embodiments described herein, a computing system, described herein as a networking device, may enable a network of systems, such as switches, servers, personal computers, and other computing devices. Such a networking device may implement one or more telemetry-data monitoring systems. Implementing a telemetry-data monitoring system may include recording telemetry data in a cyclic buffer, detecting an anomaly or a trigger condition, and outputting the data from the cyclic buffer for analysis. In some implementations, implementing a telemetry-data monitoring system may include sampling telemetry data using a first sampler, predicting, based on the data sampled using the first sampler, a future anomaly, and in response to the prediction of the future anomaly initiating sampling at a faster rate using a second sampler. The data from the second sampler may be used to monitor a network and/or provide additional training for a model which performs the predicting of the future anomaly. The systems and methods described herein may provide for the prediction of future anomalies and other issues relating to networking devices.

In an illustrative example, a system is disclosed that includes one or more circuits to: receive a set of telemetry data via a network; process the set of telemetry data to identify one or more trigger conditions; and in response to identifying the one or more trigger conditions, analyze the set of telemetry data to train a neural network to predict the one or more trigger conditions.

Aspects of the above example system include any one or more of: wherein the data is stored in a cyclic buffer; wherein processing the data comprises processing contents of the cyclic buffer; wherein the contents of the cyclic buffer comprises data received for a time period before and after the one or more trigger conditions; wherein the contents of the cyclic buffer comprises data received after the one or more trigger conditions; wherein the data is received via a software development kit (SDK) hardware interface; and wherein processing the data comprises exporting the data to a machine learning system.

In another example, a system is disclosed that includes one or more circuits to: sample a stream of telemetry data received via a network at a first rate; process the sampled stream of telemetry data using an artificial intelligence system to predict one or more trigger conditions; and in response to predicting the one or more trigger conditions, initiate sampling of the stream of telemetry data at a second rate.

Aspects of the above example system include any one or more of: wherein sampling the telemetry data is performed by a first sampler; initiating the sampling of the stream of telemetry data is performed by a second sampler; wherein processing the data comprises executing a neural network; wherein the neural network outputs, in response to identifying one or more trigger conditions, instructions to the second sampler; wherein the stream of telemetry data is received via an SDK hardware interface; wherein sampling the telemetry data is performed at a first rate, and initiating the sampling of the stream of telemetry data is performed at a second rate; and wherein the second rate is faster than the first rate.

In yet another example, method is disclosed that includes receiving a set of telemetry data via a network; processing the set of telemetry data to identify one or more trigger conditions; and in response to identifying the one or more trigger conditions, analyzing the set of telemetry data to train a neural network to predict the one or more trigger conditions.

Aspects of the above example method include any one or more of: wherein the set of telemetry data is stored in a cyclic buffer; wherein processing the set of telemetry data comprises processing contents of the cyclic buffer; wherein the set of telemetry data is received for a time period before and after the one or more trigger conditions; wherein the set of telemetry data comprises data received after the one or more trigger conditions; wherein the set of telemetry data is received via an SDK hardware interface; and wherein analyzing the set of telemetry data comprises exporting the data to a machine learning system.

Additional features and advantages are described herein and will be apparent from the following Detailed Description and the figures.

BRIEF DESCRIPTION OF THE SEVERAL VIEWS OF THE DRAWINGS

The present disclosure is described in conjunction with the appended figures, which are not necessarily drawn to scale.

Like reference numbers and designations in the various drawings indicate like elements.

DETAILED DESCRIPTION

Figure 1:
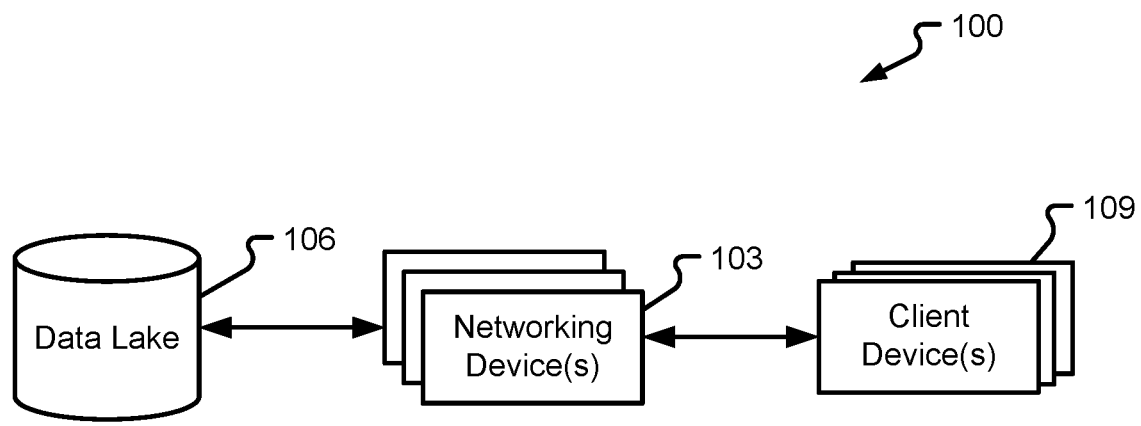
FIG. 1 is a block diagram depicting an illustrative configuration of a network in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It is understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not to be deemed "material."

The terms "determine," "calculate," and "compute," and variations thereof, as used herein, are used interchangeably, and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-8, various systems and methods for implementing telemetry data monitoring will be described. The concepts of telemetry data monitoring depicted and described herein can be applied to any type of computing system capable of receiving and/or transmitting data over a network. Such a computing system may be a switch, but it should be appreciated any type of computing system may be used. The ability of networking devices, such as switches, to traverse data is constantly increasing, managing networks of switches is becoming more complex, and reliance for the stability of such networks is increasing. As such, the need for predicting anomalies and other network issues and reducing or eliminating downtime due to such issues is growing. The systems and methods described herein may be used to mitigate and/or avoid anomalies and/or other issues relating to networking devices.

As illustrated in FIG. 1, a computing environment as described herein may be a network 100 of networking devices 103 in communication with one or more client devices 109 and data storage systems such as a data lake 106. The networking devices 103 may form a fabric including networking devices 103 such as one or more switches. Such a network 100 of networking devices 103 may be useful in various settings, from data centers and cloud computing infrastructures to artificial intelligence systems.

Networking devices 103 may be computing units, such as switches, personal computers, servers, or other computing devices, and may be responsible for executing applications and performing data processing tasks. Networking devices 103 as described herein can range from servers in a data center to desktop computers in a network, or to devices such as internet of things (IoT) sensors and smart devices.

Each networking device 103 may include one or more processing circuits, such as graphics processing units (GPUs), central processing units (CPUs), application-specific integrated circuits (ASICs), field programmable gate arrays (FPGAs), or other circuitry capable of performing computations, as well as memory and storage resources to run software applications, handle data processing, and perform specific tasks as required. In some implementations, networking devices 103 may be capable of handling intensive tasks for machine learning, AI workloads, or other complex processes.

For example, a group of networking devices 103 may operate as a high-performance computing (HPC) cluster. A group of networking devices 103 may for example comprise numerous interconnected servers, each equipped with powerful CPUs and/or GPUs. The networking devices 103 may provide computational horsepower for, as an example, training large-scale AI models or running complex scientific simulations. For AI and machine learning tasks, the networking devices 103 may comprise one or more GPUs or other processing circuitry which may be capable of handling parallel processing requirements of neural networks and other applications.

Networking devices 103 as described in greater detail herein may enable communication between client devices 109. A networking device 103 may be, for example, a switch, a network interface controller (NIC), or another device capable of receiving and sending data, and may act as a central or other node in the network. Networking devices 103 may be wired in a topology including spine switches and top-of-rack (TOR) switches for example. Networking devices 103 may be capable of receiving, processing, and forwarding data, e.g., packets, to appropriate destinations within the network, such as a data lake 106 and/or client devices 109. In some implementations, a networking device 103 as described herein may be included in a switch box, a platform, or a case which may contain one or more networking devices 103. While the description provided herein describes the performance of methods using a networking device 103, it should be appreciated the systems and methods described herein may be applicable to the use of client devices 109 as well or instead of networking devices 103.

In some implementations, each networking device 103 may be connected to one or more ports of one or more other networking devices 103 via network cables or wirelessly. Processes, such as applications, executed by networking devices 103 may involve transmitting data to nodes of the network, such as to other networking devices 103 and/or to client devices 109. Data may flow through the network of networking devices 103 using one or more protocols such as transmission control protocol (TCP), user datagram protocol (UDP), or Internet protocol (IP), for example.

A networking device 103 as described herein may be equipped with streaming telemetry capabilities which actively push detailed data about its operational status, performance metrics, and/or anomalies to one or more other networking devices 103. Each networking device 103 may continuously stream telemetry data, providing an up-to-the-moment snapshot of the health of the networking device 103, such as packet flow rates, error counts, congestion status, and utilization levels, among other indicators.

Client devices 109 as described herein may be computing devices which, for example, engage in AI-related, research-related, and other processor-intensive tasks, and utilize networking devices 103 to handle the computational loads and data throughput required by such intensive applications. Client devices 109 may include, for example, workstations and personal computers used by researchers, data scientists, and professionals for developing, testing, and running AI models and research simulations. Client devices 109 may include one or more CPUs and/or GPUs but may require additional computational power for complex tasks.

By interacting with networking devices 103, client devices 109 may be enabled to perform functions such as training machine learning models, performing data processing, running simulations, analyzing large datasets, and performing complex data processing tasks, such as data mining, pattern recognition, and predictive modeling, for examples.

Figure 2:
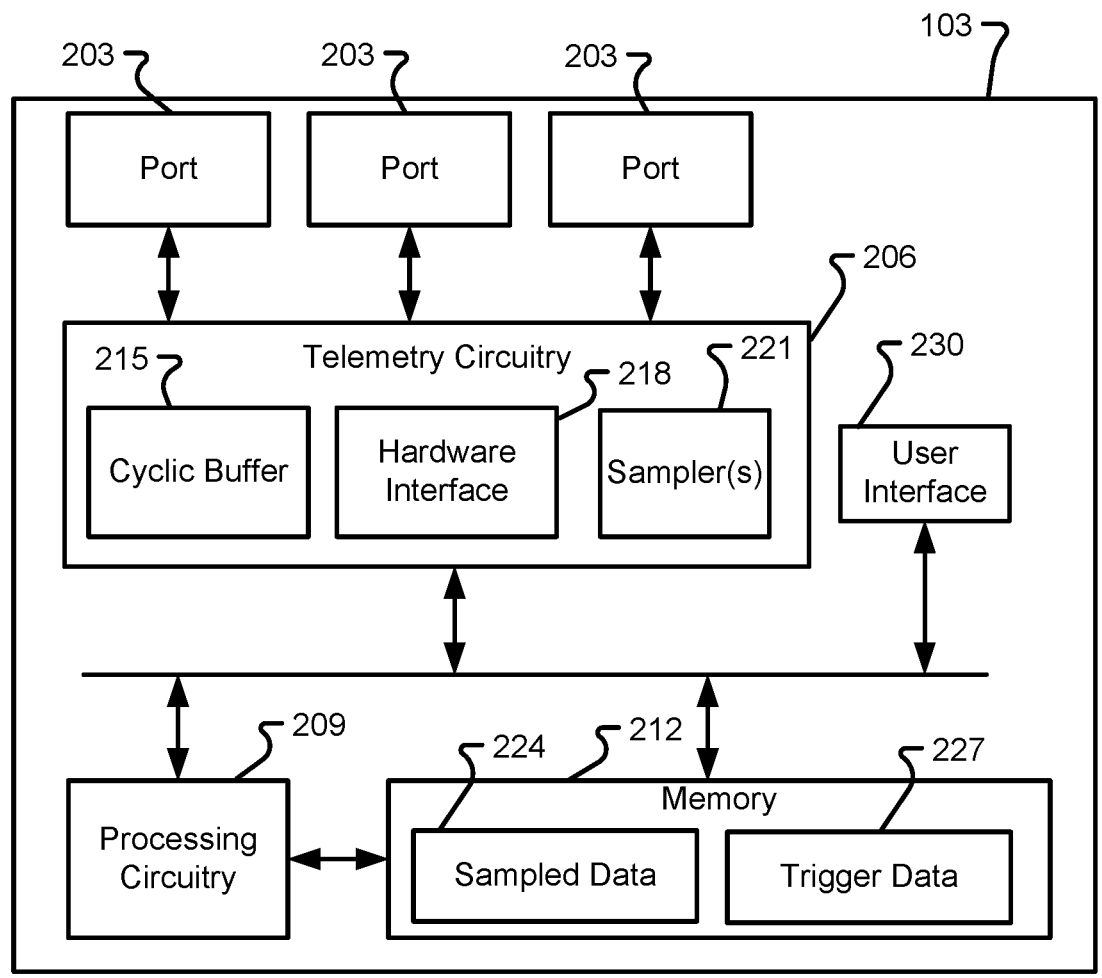
FIG. 2 is a block diagram depicting an illustrative configuration of a networking device in accordance with at least some embodiments of the present disclosure.

A networking device 103 as described herein may in some implementations be as illustrated in FIG. 2. Such a networking device 103 may include one or more ports 203, telemetry circuitry 206, processing circuitry 209, and memory 212.

The ports 203 of a networking device 103 may be capable of facilitating the transmission of data packets, or non-packetized data, into, out of, and through the networking device 103. Such ports 203 may serve as interface points where network cables may be connected, connecting the networking device 103 with other networking devices 103, data lakes 106, and/or client devices 109.

Each port 203 may be capable of receiving incoming data packets from other devices and/or transmitting outgoing data packets to other devices. In some implementations, ports 203 may be configured to operate as either dedicated ingress or egress ports 203 or may be enabled to operate in a dual functionality capable of performing ingress and egress functions. For example, an egress port 203 may be used exclusively for sending data from the networking device 103 and an ingress port 203 may be used solely for receiving incoming data into the networking device 103.

Data received via the ports 203 may include telemetry data. Telemetry data as described herein may include data from external hardware such as hardware sensors and systems. Telemetry data may include information relating to states and counters of other networking devices 103. Telemetry data as described herein may also or alternatively be received by a hardware interface 218, such as an SDK hardware interface, and may include information relating to states and counters of the networking device 103 including the hardware interface 218. States and counters may include, for example, interface counters from ports 203, such as receive (RX) bytes for example, bit error rate (BER) data, and/or other information as may be useful for predicting an anomaly as described herein.

Telemetry circuitry 206 of a networking device 103, as described in greater detail below and in relation to the systems and methods of the particular implementations described below, may be capable of receiving telemetry data associated with the networking device 103 itself or of one or more other networking devices 103. Using a system or method as described herein, telemetry circuitry 206 may be capable of recording data in the event of an anomaly or other event and/or of predicting the occurrence of an anomaly or other event and mitigating or avoiding downtime resulting as a result of the anomaly or other event. As a result, the telemetry circuitry 206 may be capable of avoiding issues within the networking device 103 as well as within a network 100 of networking devices 103.

A hardware interface 218 as described herein may comprise an SDK hardware interface and may be configured to access and collect state and counter data from one or more hardware components and sensors. The hardware interface 218 may provide real-time access to state data of hardware devices and sensors. State data as described herein may include operational status, mode settings, power states, counters relating to errors or faults, and/or other information. The hardware interface 218 may collect data originating at the networking device 103 as well as within other networking devices 103. The data collected by the hardware interface 218 may be described as telemetry data.

After being collected by the hardware interface 218, telemetry data may in some implementations be stored in a cyclical buffer 215 and/or may be sampled by one or more samplers 221 of the networking device 103.

A cyclical buffer 215 of a networking device 103, which may otherwise be known as a circular, cyclic, or ring buffer, may comprise a data structure include a fixed-size buffer which records data as if the buffer were connected end-to-end. The cyclical buffer 215 may maintain only the most recent "X" amount of data, with "X" denoting the capacity of the buffer. The cyclical buffer 215 may be initialized with a fixed size, determined by the requirement to store the most recent "X" units of data. The size of the cyclical buffer 215 may be configured to be such that when an event is detected the contents of the cyclical buffer 215 may be extracted and analyzed to understand the event as well as to train a model to predict future occurrences of the event.

The cyclical buffer 215 may maintain two pointers: a write pointer and a read pointer. The write pointer tracks where the next incoming data unit will be stored, while the read pointer tracks the location of the oldest data unit currently in the cyclical buffer 215. As new data arrives at the cyclical buffer 215 from the hardware interface 218, the data may be written at the location indicated by the write pointer. Once the cyclical buffer 215 reaches its capacity, the write pointer loops back to the beginning (or to the earliest position), overwriting the oldest data.

Samplers 221 of a networking device 103 may include telemetry data samplers designed to collect telemetry information from various sources, including network devices 103, hardware sensors, CPUs, and other hardware devices and applications, at a predetermined sampling rate. The sampling rate may determine how frequently the sampler 221 retrieves data. As described herein, in some implementations multiple samplers 221 may be used and each sampler 221 may sample a different amount of data and/or sample at a different rate.

In support of the functionality of the telemetry circuitry 206, processing circuitry 209 may be configured to control aspects of the telemetry circuitry 206 to accomplish event prediction and/or detection. The processing circuitry 209 may in some implementations include a CPU, an ASIC, and/or other processing circuitry which may be capable of handling computations, decision-making, and management functions required for operation of the networking device 103.

Processing circuitry 209 may be configured to perform processes such as telemetry data analysis, prediction model training, and other functions as described below, as well as functions such as setting up routing tables, configuring ports, and otherwise managing operation of the networking device 103. Processing circuitry 209 may be configured to execute software and/or firmware to configure and manage the networking device 103, such as an operating system and management tools.

The processing circuitry 209 may be configured to execute computer-readable instructions to control one or more components of the networking device 103 to perform one or more of the methods and/or processes described herein. The processing circuitry 209 may include, for example, one or more CPUs which may each include one or more cores (e.g., one, two, four, eight, twenty-eight, seventy-two, etc.) capable of handling a multitude of software threads simultaneously. The processing circuitry 209 may include any suitable type of processor or microprocessor. As an example, and without limitation, the processing circuitry 209 may include different types of processors depending on the type of networking device 103 implemented (e.g., processors with fewer cores for mobile devices and processors with more cores for servers). For example, depending on the type of networking device 103, the processing circuitry 209 may include an ARM processor implemented using reduced instruction set computing (RISC) and/or an x86 processor implemented using complex instruction set computing (CISC).

Memory 212 of a networking device 103 as described herein may comprise one or more memory elements capable of storing configuration settings, application data, operating system data, and other data. Such memory elements may include, for example, random access memory (RAM), dynamic RAM (DRAM), flash memory, non-volatile RAM (NVRAM), ternary content-addressable memory (TCAM), static RAM (SRAM), and/or memory elements of other formats. Memory 212 may store, for example, sampled telemetry data 224, trigger-related data 227 such as thresholds or attributes used to detect the occurrence of an anomaly or other event, as well as data necessary for implementing prediction models as described herein.

A user interface 230 of a networking device 103 may include a communication interface including one or more receivers, transmitters, and/or transceivers that enable the networking device 103 to communicate with other computing devices via an electronic communication network, included wired and/or wireless communications. Such a communication interface may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The user interface 230 of a networking device 103 may also be enabled to be logically coupled to one or more input/output (I/O) components, some of which may be built in to (e.g., integrated in) the networking device 103. Illustrative I/O components include a microphone, mouse, keyboard, joystick, game pad, game controller, satellite dish, scanner, printer, wireless device, etc. The user interface 230 of a networking device 103 may also include one or more presentation components such as a display (e.g., a monitor, a touch screen, a television screen, a heads-up-display (HUD), other display types, or a combination thereof), speakers, and/or other presentation components.

As described above, datacenter networks are increasing in size and becoming bandwidth intensive. Conventional telemetry monitoring techniques (such as SNMP) do not provide data at a fast enough rate to accomplish automation tasks. Telemetry data is needed to be acquired at a faster rate and at a higher resolution. A trigger as described herein enables the recording of telemetry data at a fast enough rate only when necessary or likely to prove helpful. Such a trigger is beneficial because constantly acquiring data at a fast rate costs too much compute and requires too much storage space.

Making network-generated analytics more real-time and with a higher resolution provides a great opportunity to monitor and debug the network in a much more precise way as compared to conventional methods. Combining the collection of data as described herein with AI and/or ML systems, the systems and methods described herein provide the potential to detect and/or predict network events such as link faults, device faults, protocol faults, congestion events, cyber-attacks, anomalies, and more.

The systems and methods described herein provide a mechanism capable of sampling statistics (e.g., counters) in a high-resolution, e.g., ten or more counters per port, with a sampling period less than 100 microseconds.

Extended Berkeley Packet Filter (eBPF) is a technology that gives the ability to inject code to the Linux Kernel by attaching the code to the execution of another code. The injected code is not preempted, thus arrives at the Linux Kernel in real-time and with high performance. From another perspective, eBPF is a software code that can be handled outside of Kernel and SDK modules. As such, eBPF has the provides a balance between flexibility and performance.

Figure 3:
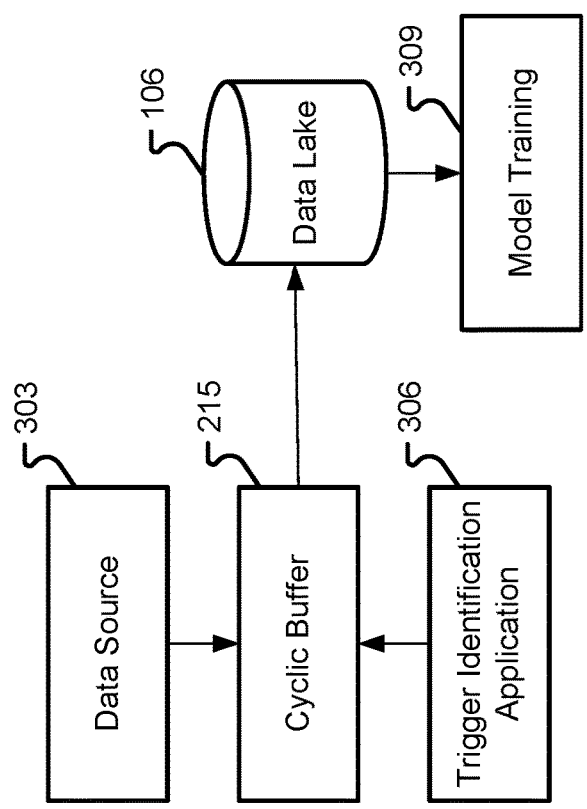
FIG. 3 is a block diagram depicting an illustrative configuration of a telemetry data monitoring system performed by a networking device in accordance with at least some embodiments of the present disclosure.

FIG. 3 illustrates elements of a data recording system utilizing a cyclic buffer 215 as may be implemented by a networking device 103 in accordance with one or more implementations of the present disclosure.

As illustrated in FIG. 3, a cyclic buffer 215 of a networking device 103 may receive data from a data source 303. A data source 303 as described herein may be a stream of telemetry data such as states and counters relating to the networking device 103 and/or one or more other networking devices 103. The data source 303 may be, for example, a hardware interface 218.

The cyclic buffer 215 as described above may record the received data and may keep a constantly refreshing history of the received data over a predetermined amount of time. The amount of data held in the cyclic buffer 215 may be system-dependent and may vary between implementations. The amount of data held in the cyclical buffer 215 may be tuned in such a way as to provide a sufficient amount of data for analysis purposes as described below.

A trigger identification application 306 executed by processing circuitry 209 of the networking device 103 may continuously scan the data within the cyclic buffer 215 to identify specific conditions or triggers. In some implementations, the trigger identification application 306 may, instead of scanning the data within the cyclic buffer 215, identify a trigger based on data from other sources. When a trigger is identified, the trigger identification application may initiate a data export process, causing the current contents of the cyclic buffer 215 to be exported to a repository, such as a data lake 106.

A trigger as described herein may include one or more of events including, for example, a link failure, a device failure, excessive congestion, a security breach, an unusual traffic pattern, an excessively high error rate, a degradation in performance, an unauthorized or erroneous configuration change, an environmental event, and/or other events, as well as a detection of conditions in which the risk of such an event exceeds a threshold.

A link failure may include a connection between two networking devices or nodes becoming non-operational due to physical issues (like cable damage), misconfiguration, hardware failure, or otherwise. A device failure may include a situation where a networking device such as a router, switch, or firewall ceases to function correctly due to hardware malfunction, software errors, power outages, or otherwise. Network congestion may include when a demand on particular network resources exceeds an available capacity, leading to packet delays, jitter, and loss. A security breach may include any unauthorized access, intrusion, or attack on the network, including, for example, distributed denial of service (DDoS) attacks, malware infections, and data breaches. An unusual traffic pattern may include, for example, sudden spikes in traffic, unexpected data flows, or traffic at unusual times. High error rates may be defined as increased error rates in data transmission, such as CRC errors, frame collisions, and dropped packets, can indicate physical layer problems, faulty hardware, or congestion. Persistent high error rates necessitate diagnostics to prevent data corruption and performance degradation. Performance degradation may include significant deviations from baseline performance metrics such as throughput, latency, and packet delivery ratios may signal underlying issues like hardware failure, software bugs, or suboptimal routing. Addressing performance degradation promptly ensures consistent network service levels. Unauthorized configuration changes may include any unauthorized or erroneous configuration changes which may disrupt network operations and security. Environmental factors may include conditions such as overheating, power fluctuations, and/or physical tampering with networking equipment. Other events may include any events which may lead to the exhaustion of critical resources, such as bandwidth, memory, and/or CPU cycles, which may be caused by misconfigurations, attacks, or hardware limitations.

A data lake 106 as described herein may be a centralized repository capable of storing and in some implementations processing data from one or more networking devices 103. A data lake 106 may receive data from a cyclic buffer 215 in response to a trigger or instructions from a trigger identification application 306.

In some implementations, a data lake 106 may receive data output by cyclic buffers 215 of a variety of different networking devices 103. Data received by a data lake 106 may be stored in its raw form and/or may be preprocessed by a networking device 103 before being received by the data lake 106. In some implementations, data from a cyclic buffer 215 may be tagged with metadata indicating information such as the source of the data. A data lake 106 may facilitate real-time processing and/or data stored in the data lake 106 may be later processed for analysis.

In some implementations, an offline training application may be responsible for exporting specific data sets, such as data from a cyclic buffer 215 out of the networking device 103. Such data may be used for further analysis and model training in an external environment such as the data lake 106.

In some implementations, data in a data lake 106 may be processed and used for model training 309. For example, exported data from the networking device 103 may be used to train and refine predictive models as described in greater detail below.

While only one cyclic buffer 215 is illustrated in FIGS. 2 and 3, it should be appreciated that in some implementations a single networking device 103 may include any number of cyclic buffers 215. For example, a plurality of hardware components of a networking device 103 may be associated with a dedicated cyclic buffer 215. When a trigger is identified for a specific hardware component, data from a cyclic buffer 215 associated with the specific hardware component may be output.

Figure 4:
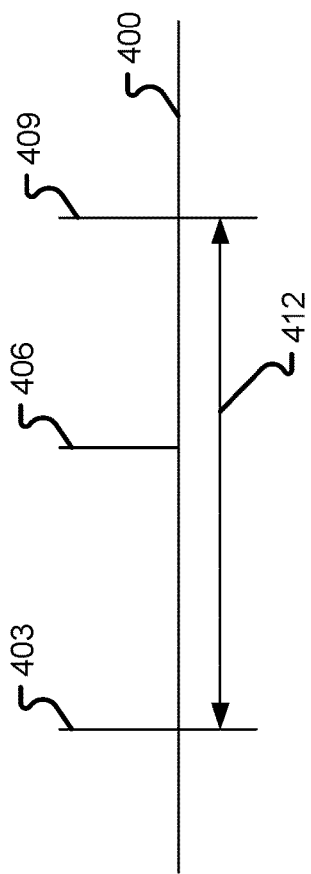
FIG. 4 is a timeline of an illustrative method of monitoring telemetry data performed by a networking device in accordance with at least some embodiments of the present disclosure.

FIG. 4 illustrates a timeline of data captured using a cyclic buffer system as described herein. Line 400 shows time from an origin on the left to the future on the right. At 403, a cyclic buffer 215 is capturing data from a data source 303. The cyclic buffer 215 may have also been collecting data prior to 403. At 406, a trigger is detected by a trigger identification application 306. At 409, the content of the cyclic buffer 215 is output to a destination such as a data lake 106. The arrow 412 illustrates the content of the cyclic buffer 215, from 403 to 409, which is output due to the detection of the trigger at 406. It should be appreciated that in some implementations certain variations to the timeline may be made. For example, in some implementations the content of the cyclic buffer 215 may be immediately output upon detection of the trigger at 406. In such an implementation, the content of the cyclic buffer 215 may include data prior to 403 and may not include data between 406 and 409.

Figure 5:
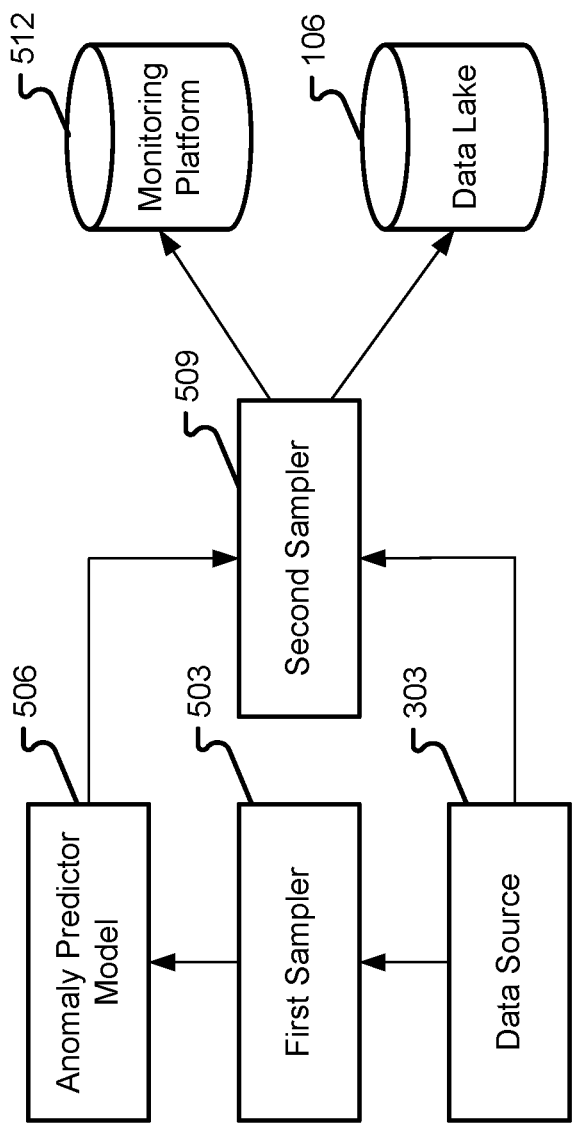
FIG. 5 is a block diagram depicting an illustrative configuration of a telemetry data monitoring system performed by a networking device in accordance with at least some embodiments of the present disclosure.

FIG. 5 illustrates an implementation involving a trained anomaly predictor model 506. An anomaly predictor model 506 may be trained based on contents of cyclic buffer(s) 215 output upon detection of a triggering event. When a trigger is detected, as described below in relation to FIG. 7, cyclic buffer containing state and counter data relating to hardware components involved in the triggering event may be output for model training 309. Once an anomaly predictor model 506 is trained, the anomaly predictor model 506 may be utilized in a system as illustrated in FIG. 5.

The anomaly predictor model 506 may receive data from a data source 303 via a first sampler 503. The data source 303 may, as described above, include a hardware interface 218. In some implementations, the anomaly predictor model 506 may receive data associated with a plurality of different hardware components or may receive data associated with a specific hardware component.

The first sampler 503 may continuously sample data from the data source 303 at a particular data rate and/or resolution.

In some implementations, the first sampler 503 may be designed to collect data directly from one or more hardware sensors or devices. The first sampler 503 may sample at a first sampling rate, which may be measured in samples per second (Hz). The first sampler 503 may also sample at a first resolution, referring to the granularity of the data collected. The sampling rate and resolution of the first sampler 503 or any other sampler described herein may be configurable, such as to match particular requirements of the anomaly predictor model 506.

The first sampler may sample at a slower sampling rate as compared to a second sampler 509. As described below, when the anomaly predictor model 506 predicts a future occurrence of a triggering event, the second sampler 509 may be activated and may begin sampling the data source 303 or any data source at a faster rate and/or a higher resolution as compared to the first sampler. Data from the second sampler 509 may be output to one or more of a monitoring platform 512 and/or a data lake 106.

The anomaly predictor model 506 may be trained using the model training 309 described above to detect a triggering event before the triggering event occurs. The anomaly predictor model 506 may be configured to output a trigger signal. A trigger signal output by an anomaly predictor model 506 may be used as a trigger to signal to the second sampler 509 to begin sampling for a particular amount of time. The amount of time may be dependent on how far in advance the anomaly predictor model 506 is capable of predicting a triggering event and/or may be dependent on other factors such as an amount of data relating to a triggering event needed for analysis or other purposes.

The anomaly predictor model 506 avoids the necessity of a cyclic buffer 215, however it should be appreciated a cyclic buffer 215 and an anomaly predictor model 506 may be used together.

In some implementations, the anomaly predictor model 506 may be trained based on a particular event, based on user configurations, and/or based on one or more thresholds. For example, the anomaly predictor model 506 may be configured to constantly compute an odds or confidence that one or more particular triggering events will occur and upon the odds or confidence exceeding a threshold, signal to the second sampler 509 to begin sampling. Such a system, as described below in relation to FIG. 8 allows for predictive maintenance by detecting ahead of time that a link is going to fail, or another type of event will occur.

The data from the second sampler 509 may be transmitted to a monitoring platform 512 and/or a data lake 106. A monitoring platform 512 may be configured to respond to potential triggering events by receiving data from the second sampler, processing the data, identifying the hardware components involved in the potential triggering event, and performing actions such as notifying a user or performing mitigation functions. Mitigation functions may include, for example, rerouting data to avoid a potential link failure causing a loss of data.

Data from the second sampler 509 transmitted to a data lake 106 may be used for training purposes such as for training the anomaly predictor model 506 or another model to predict triggering events.

Figure 6:
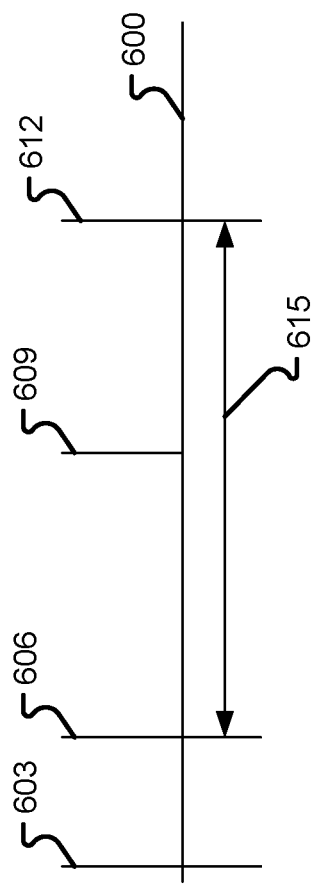
FIG. 6 is a timeline of an illustrative method of monitoring telemetry data performed by a networking device in accordance with at least some embodiments of the present disclosure.

FIG. 6 illustrates a timeline of data captured using an anomaly predictor model system as illustrated in FIG. 5. Line 600 shows time from an origin on the left to the future on the right. At 603, a first sampler 503 samples from a data source 303 at a first rate and a first resolution. Data from the first sampler 503 is processed by an anomaly predictor model 506. At 606, a trigger is predicted by the anomaly predictor model 506, and the anomaly predictor model 506 prompts a second sampler 509 to begin sampling from the data source 303 at a second rate and a second resolution. One or both of the second rate and the second resolution may be greater than the first rate and the first resolution. At 609, the predicted triggering event occurs. At 612, the second sampler ceases sampling after a predetermined amount of time following either the anomaly predictor model 506 predicting the triggering event or the occurrence of the triggering event itself. The line 615 illustrates the sampling of the data by the second sampler 509, from 606 to 612, which is output by the second sampler 509 due to the prediction of the trigger at 606.

Figure 7:
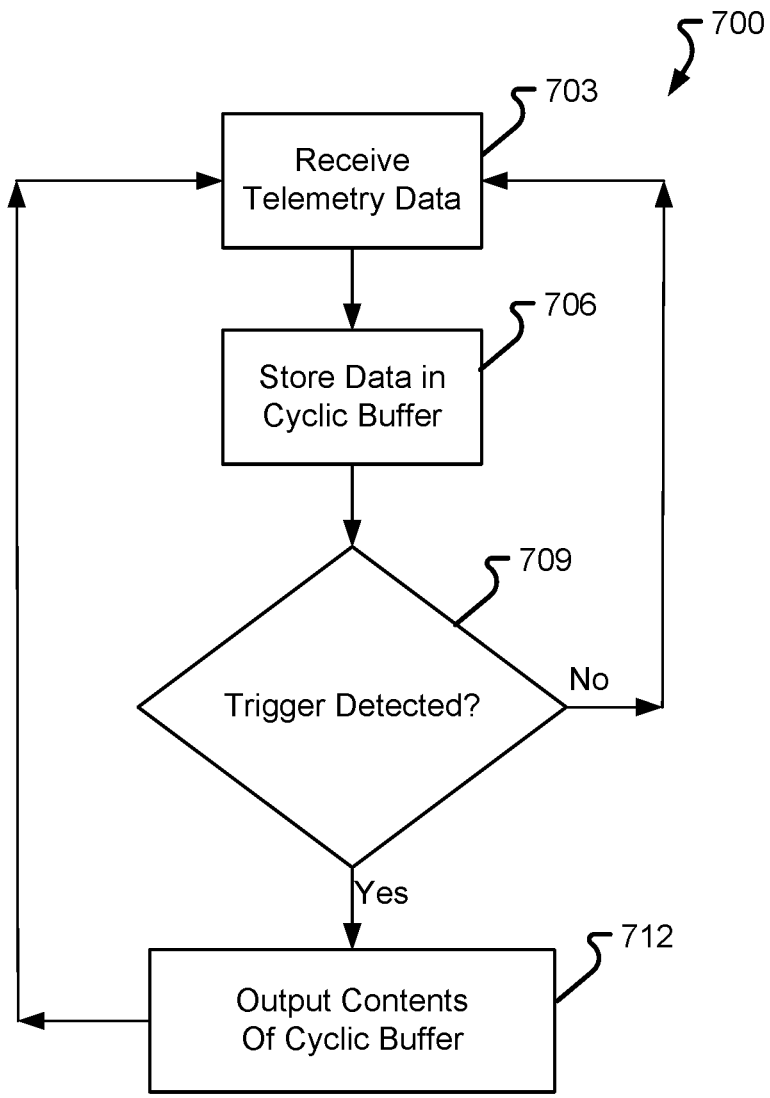
FIG. 7 is a flowchart depicting an illustrative configuration of a method in accordance with at least some embodiments of the present disclosure.

FIG. 7 illustrates a method 700 utilizing a cyclic buffer 215 as illustrated in FIG. 3 for collecting data relating to a triggering event. The method 700 may be useful in scenarios in which an anomaly predictor model 506 is either not trained or impractical for use.

The method 700 may begin at 703 in which telemetry data is received by a networking device 103. As described above, the telemetry data may be generated by the networking device 103 or received from one or more other networking devices 103. The method 700 may be used in either situation, as well as a combination of situations, such as a scenario in which a networking device 103 monitors its own telemetry data as well as telemetry data of other networking devices 103.

The telemetry data may be received by the networking device 103 from a data source 303 via a hardware interface 218 as described above. The hardware interface 218 may in some implementations continuously scan for new data. The hardware interface 218 may be, for example, an SDK. The hardware interface 218 may be configured to gather data from one or more hardware sensors or systems. Telemetry data, as described above, may include data such as BER data, state data, counters such as interface counters from ports, or other information which may prove useful for determining a trigger event has occurred.

At 706, the received data may be stored in a cyclic buffer 215. As described above and illustrated in FIG. 3, a cyclic buffer 215 may record the received data and may keep a constantly refreshing history of the received data over a predetermined amount of time. The amount of data held in the cyclic buffer 215 may be system-dependent and may vary between implementations. The amount of data held in the cyclical buffer 215 may be tuned in such a way as to provide a sufficient amount of data for analysis purposes as described below.

At 709, a trigger may be detected, such as by a trigger identification application 306 executed by processing circuitry 209 of the networking device 103 which, as described above, may continuously scan data within the cyclic buffer 215, or other data, to identify specific conditions or triggers. In some implementations, the trigger identification application 306 may, instead of scanning the data within the cyclic buffer 215, identify a trigger based on data from other sources.

A trigger, as described above, may include one or more events including, for example, a link failure, a device failure, excessive congestion, a security breach, an unusual traffic pattern, an excessively high error rate, a degradation in performance, an unauthorized or erroneous configuration change, an environmental event, and/or other events, as well as a detection of conditions in which the risk of such an event exceeds a threshold.

At 712, in response to the detection of the trigger, the contents of the cyclic buffer 215 may be output to a data repository such as a data lake 106. When a trigger is identified, the trigger identification application 306 may initiate a data export process, causing the current contents of the cyclic buffer 215 to be exported from the cyclic buffer 215. In this way, when a triggering event occurs, the cyclic buffer 215 enables the saving of data prior to the trigger.

In some implementations, the trigger identification application 306 may delay the output of the cyclic buffer 215 such that the contents of the cyclic buffer 215 output during the export process comprises data received for a time period before and after the triggering event. In other implementations, the trigger identification application 306 may cause the output of the cyclic buffer 215 to occur immediately such that the contents of the cyclic buffer 215 output during the export process comprises data received only for a time period immediately before the triggering event.

Data export from the cyclic buffer 215 may be used to train a model, such as an anomaly predictor model 506 which may be used to perform a method 800 as described below as part of a prediction based approach. By way of the method 700, applications can collect telemetry data relating to the occurrence of a triggering event, train an anomaly predictor model 506, and use the anomaly predictor model 506 in such a way as to eliminate the need for the cyclic buffer 215. It should be appreciated, however, that the two methods may be used in conjunction. For example, the cyclic buffer 215 data may be used to train an already performing anomaly predictor model 506 to better predict triggering events or to predict other triggering events.

As described above, the contents of the cyclic buffer 215 may be output to a data lake 106. Data received by a data lake 106 may be stored in its raw form and/or may be preprocessed by the networking device 103 before being received by the data lake 106. In some implementations, data from the cyclic buffer 215 may be tagged with metadata indicating information such as the source of the data. A data lake 106 may facilitate real-time processing and/or data stored in the data lake 106 may be later processed for analysis. For example, data in a data lake 106 may be processed and used for model training 309.

Figure 8:
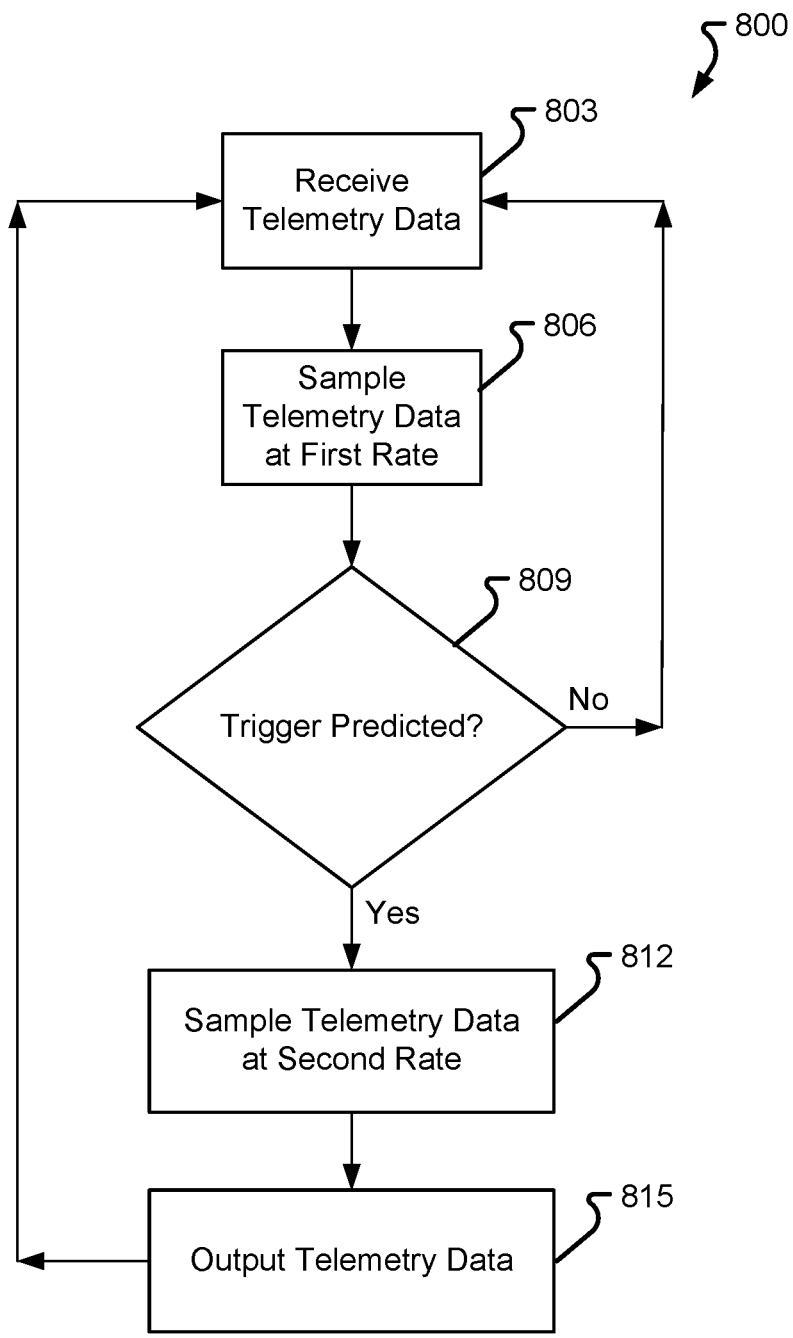
FIG. 8 is a flowchart depicting an illustrative configuration of a method in accordance with at least some embodiments of the present disclosure.

FIG. 8 illustrates a method 800 utilizing an anomaly predictor model 506 as illustrated in FIG. 5 for predicting a triggering event and causing a high rate and high resolution sampling of telemetry data to begin prior to the triggering event. The method 800 may be useful in scenarios in which an anomaly predictor model 506 has been trained, such as based on data from a cyclic buffer 215 through a method 700 as described above.

The method 800 may begin at 803 in which a networking device 103 receives telemetry data. As described above, the telemetry data may be generated by the networking device 103 or received from one or more other networking devices 103. The method 800 may be used in either situation, as well as a combination of situations, such as a scenario in which a networking device 103 monitors its own telemetry data as well as telemetry data of other networking devices 103.

The telemetry data may be received by the networking device 103 from a data source 303 via a hardware interface 218 as described above. The hardware interface 218 may in some implementations continuously scan for new data. The hardware interface 218 may be, for example, an SDK. The hardware interface 218 may be configured to gather data from one or more hardware sensors or systems. Telemetry data, as described above, may include data such as BER data, state data, counters such as interface counters from ports, or other information which may prove useful for determining a trigger event has occurred.

At 806, a first sampler 503 may sample the telemetry data at a first rate. The first sampler 503 may continuously sample data from the data source 303 or hardware interface 218 at a particular data rate and/or resolution. In some implementations, the first sampler 503 may be designed to collect data directly from one or more hardware sensors or devices. The first sampler 503 may sample at a first sampling rate, which may be measured in samples per second (Hz). The first sampler 503 may also sample at a first resolution, referring to the granularity of the data collected. The sampling rate and resolution of the first sampler 503 or any other sampler described herein may be configurable, such as to match particular requirements of the anomaly predictor model 506.

At 809, an anomaly predictor model 506 may receive data from the first sampler 503, process the data from the first sampler, and determine whether a triggering event as described above is likely to occur within a particular amount of time. As described above, the anomaly predictor model 506 may be trained using model training 309 to detect a triggering event before the triggering event occurs.

A trigger, as described above, may include one or more events including, for example, a link failure, a device failure, excessive congestion, a security breach, an unusual traffic pattern, an excessively high error rate, a degradation in performance, an unauthorized or erroneous configuration change, an environmental event, and/or other events, as well as a detection of conditions in which the risk of such an event exceeds a threshold.

The anomaly predictor model 506 may process the sampled stream of telemetry data using an AI or ML system such as a neural network to predict the one or more trigger conditions. The anomaly predictor model 506 may be configured to output one or more trigger signals or conditions which may be provided as instructions to a second sampler to begin sampling. A trigger signal output by an anomaly predictor model 506 may be used as a trigger to signal to the second sampler 509 to begin sampling for a particular amount of time. The amount of time may be dependent on how far in advance the anomaly predictor model 506 is capable of predicting a triggering event and/or may be dependent on other factors such as an amount of data relating to a triggering event needed for analysis or other purposes.

At 812, the second sampler may begin sampling telemetry data at a second rate. As described above, the first sampler 503 may sample at a slower sampling rate as compared to a second sampler 509. When the anomaly predictor model 506 predicts a future occurrence of a triggering event, the second sampler 509 may be activated and may begin sampling the data source 303 or any data source at a faster rate and/or a higher resolution as compared to the first sampler.

As should be appreciated, the data sampled by the second sampler 509 may be the same data as sampled by the first sampler 503 or may be a different set of data. For example, the first sampler 503 may sample from a first data source and the second sampler 509 may sample from a second data source. The first sampler 503 may sample data sufficient for use by the anomaly predictor model 506 to predict the future occurrence of a triggering event while the second sampler 509 may be configured to sample data as may be necessary for analysis or mitigation or avoidance of the predicted triggering event.

In some implementations, the functions of the first sampler 503 and the second sampler 509 may be performed by a single sampler. For example, upon predicting a triggering event based on data from a sampler, the anomaly predictor model may prompt the same sampler to begin sampling at a faster rate and/or at a higher resolution and/or to begin sampling from a different or additional set of data.

At 815, the sampled telemetry data may be output to one or more of a monitoring platform 512 and/or a data lake 106. A monitoring platform 512 may for example be configured to respond to potential triggering events by receiving data from the second sampler 509, processing the data, identifying any hardware components involved in the potential triggering event, and performing actions such as notifying a user or performing mitigation functions. Mitigation functions may include, for example, rerouting data to avoid a potential link failure causing a loss of data.

Data from the second sampler 509 transmitted to a data lake 106 may for example be used for training purposes such as for retraining the anomaly predictor model 506 or training another model to predict triggering events.

The data output to the monitoring platform 512 and/or the data lake 106 may be data from the moment the future triggering event is predicted point until the event occurs or a point in time following the occurrence of the event. If the triggering event does not occur, such as within a predetermined window of time, the output of the sampled telemetry data may end.

Data output by the second sampler 509 may be used for analysis and model training. In some implementations, an offline training component, which may be a part of a data lake 106, may receive data from the second sampler 509 for model training and enhancement. Such an external cloud process may be distinct from a system internal to the networking device 103 and may focus on model development and enhancement. An offline training component may utilize data from the second sampler 509 to train and refine predictive models. The output of the offline training component may be an updated model which may be integrated back into the networking device and used as a new anomaly detector model 506.

The systems and methods described herein enable a networking device 103 to respond automatically in response to an anomaly prediction or to an occurrence of an anomaly. For example, a prediction of a link or port failure may result in routing to automatically change to avoid impact to services in the event of the predicted link or port failure occurring. Other triggering events which may be predicted and avoided include, for example, congestion events, cyberattacks, and other anomalies. As a result of using the methods and systems described herein, the failure of services such as AI tasks can be avoided. The systems and methods described herein may be used in relation to a NIC of any type of computing system, a switch, a data processing unit (DPU), or other computing device.

The present disclosure encompasses methods with fewer than all of the steps identified in FIGS. 7 and 8 (and the corresponding description of the methods 700 and 800), as well as methods that include additional steps beyond those identified in FIGS. 7 and 8 (and the corresponding description of the methods 700 and 800). The present disclosure also encompasses methods that comprise one or more steps from the methods described herein, and one or more steps from any other method described herein.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art. It is to be appreciated that any feature described herein can be claimed in combination with any other feature (s) as described herein, regardless of whether the features come from the same described embodiment.

What is claimed is:

1. A system comprising one or more circuits to:
sample a stream of telemetry data received via a network at a first rate;
process the sampled stream of telemetry data using an artificial intelligence system to predict one or more trigger conditions; and
in response to predicting the one or more trigger conditions, initiate sampling of the stream of telemetry data at a second rate.

2. The system of claim 1, wherein sampling the telemetry data is performed by a first sampler, and initiating the sampling of the stream of telemetry data is performed by a second sampler.

3. The system of claim 2, wherein processing the data comprises executing a neural network.

4. The system of claim 3, wherein the neural network outputs, in response to identifying one or more trigger conditions, instructions to the second sampler.

5. The system of claim 1, wherein the stream of telemetry data is received via a software development kit (SDK) hardware interface.

6. The system of claim 1, wherein sampling the telemetry data is performed at a first rate, and initiating the sampling of the stream of telemetry data is performed at a second rate, wherein the second rate is faster than the first rate.

7. The system of claim 1, wherein the artificial intelligence system is trained to predict the one or more trigger conditions by processing a set of telemetry data received via the network.

8. The system of claim 7, wherein the set of telemetry data is stored in a cyclic buffer and processing the sampled stream of telemetry data comprises processing contents of the cyclic buffer.

9. The system of claim 8, wherein the contents of the cyclic buffer comprises data received for a time period before and after a second one or more trigger conditions.

10. A network device comprising one or more circuits to:
sample a stream of telemetry data received via a network at a first rate;
process the sampled stream of telemetry data using an artificial intelligence system to predict one or more trigger conditions; and
in response to predicting the one or more trigger conditions, initiate sampling of the stream of telemetry data at a second rate.

11. The network device of claim 10, wherein sampling the telemetry data is performed by a first sampler, and initiating the sampling of the stream of telemetry data is performed by a second sampler.

12. The network device of claim 11, wherein processing the data comprises executing a neural network.

13. The network device of claim 12, wherein the neural network outputs, in response to identifying one or more trigger conditions, instructions to the second sampler.

14. The network device of claim 10, wherein the stream of telemetry data is received via a software development kit (SDK) hardware interface.

15. The network device of claim 10, wherein sampling the telemetry data is performed at a first rate, and initiating the sampling of the stream of telemetry data is performed at a second rate, wherein the second rate is faster than the first rate.

16. The network device of claim 10, wherein the artificial intelligence system is trained to predict the one or more trigger conditions by processing a set of telemetry data received via the network.

17. The system of claim 16, wherein the set of telemetry data is stored in a cyclic buffer and processing the sampled stream of telemetry data comprises processing contents of the cyclic buffer.

18. The system of claim 17, wherein the contents of the cyclic buffer comprise data received for a time period before and after a second one or more trigger conditions.

19. A system, comprising:
a processor; and
a computer-readable storage medium coupled with the processor, wherein the computer-readable storage medium comprises instructions stored thereon that, when executed by the processor, enable the processor to:
sample a stream of telemetry data received via a network at a first rate;
process the sampled stream of telemetry data using an artificial intelligence system to predict one or more trigger conditions; and
in response to predicting the one or more trigger conditions, initiate sampling of the stream of telemetry data at a second rate.

20. The system of claim 19, wherein the sampling of the stream of telemetry data at the first rate is performed by a first sampler, and the sampling of the stream of telemetry data at the second rate is performed by a second sampler.

* * * * *